United States Patent Office 2,825,428
Patented Mar. 4, 1958

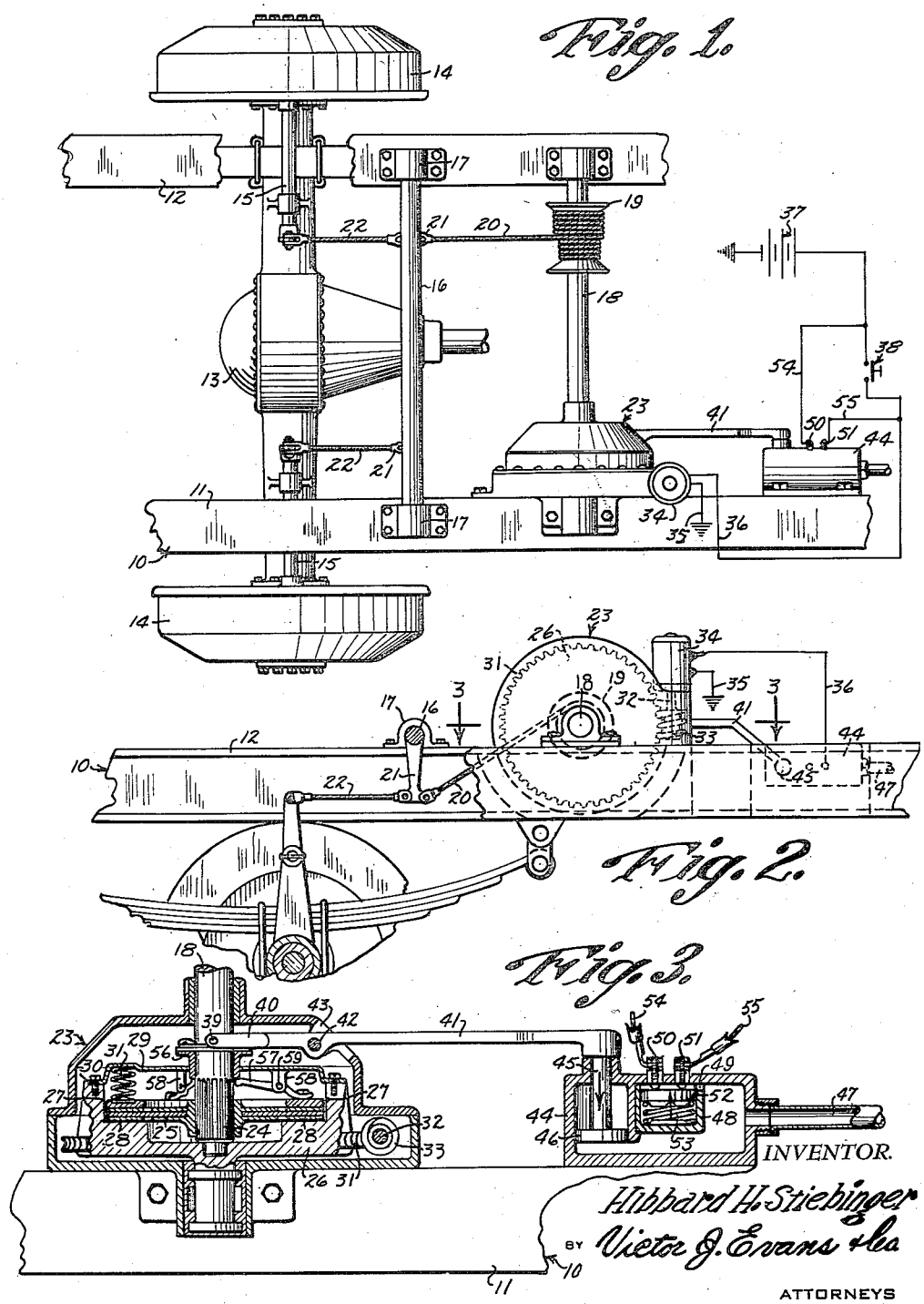

2,825,428

EMERGENCY BRAKE

Hibbard Henry Stiebinger, San Pablo, Calif.

Application June 5, 1956, Serial No. 589,394

3 Claims. (Cl. 188—162)

This invention relates to a vehicle such as a truck or trailer, and more particularly to an emergency brake system for such a vehicle.

The object of the invention is to provide a brake assembly for a vehicle which will be automatically actuated in the event the regular brakes on the vehicle fail.

Another object of the invention is to provide an emergency brake assembly for use with vehicles of the type that use air brakes so that in the event that the brake system fails, the emergency brake of the present invention will be actuated so that the clutch can only be engaged to operate the emergency brake when the air system fails or when the operator actuates the starter motor.

A further object of the invention is to provide an emergency brake system which is extremely simple and inexpensive to manufacture.

Other objects and advantages will be apparent during the course of the following description.

In the accompanying drawings, forming a part of this application, and in which like numerals are used to designate like parts throughout the same, Figure 1 is a fragmentary plan view of the emergency brake system, constructed according to the present invention, and with parts broken away and in section.

Figure 2 is a fragmentary side elevational view of the emergency brake system of the present invention.

Figure 3 is a sectional view taken on the line 3—3 of Figure 2.

Referring in detail to the drawings, the numeral 10 designates a portion of a vehicle chassis which may form part of a vehicle such as a truck or trailer, and the chassis 10 may include the usual beams 11 and 12 as well as the differential 13. The numeral 14 designates the wheel drums, while the numeral 15 designates the brake rods which are adapted to actuate the brakes within the drums 14.

Extending transversely between the pair of beams 11 and 12 is a first shaft 16 which may be rotatably supported by means of bearings 17. There is further provided a second shaft 18 which is arranged in spaced parallel relation with respect to the first shaft 16, and the shaft 18 has a reel 19 mounted thereon, Figure 1. A cable 20 is trained over the reel 19 and is secured thereto, and one end of the cable 20 is connected to a lever 21. There are a pair of the levers 21, and the levers depend from the shaft 16 and are secured thereto. Cables 22 extend from the levers 21, and the cables 22 are connected to the brake rods 15.

There is further provided a housing which is indicated generally by the numeral 23, and the housing 23 is secured to one of the beams 11. The housing 23 is hollow, and a splined portion 24 of the shaft 18 is arranged within the housing 23, Figure 3. The splined portion 24 of the shaft 18 extends through clutch plates 25, and arranged in the housing 23 is a rotary disc or flywheel 26. The disc 26 is provided with a recess 27 which defines a shoulder 28, and the clutch plates 25 are adapted to move into and out of frictional engagement with the shoulder 28 on the disc 26.

Secured to the disc 26 in any suitable manner, as for example by means of securing elements 30 is a cap 29. Resilient means such as a coil spring 31 is interposed between the cap 29 and the clutch plates 25. The outer surface of the disc 26 is provided with teeth 31, and a shaft 32 has a worm 33 thereon, the worm 33 meshing with the teeth 31. The shaft 32 is driven by a motor 34 which is arranged exteriorly of the housing 23. Wires 35 and 36 lead from the motor 34, and the wire 35 may be ground wire. The numeral 37 designates a source of electrical energy such as a battery which may be mounted in the vehicle, while the numeral 38 designates a manually operable switch which may be arranged in any convenient location such as on the dashboard of the vehicle being operated.

There is further provided an arm 41 which may be pivotally connected to the housing 23 through the medium of a pivot pin 42, and the arm 41 may extend through a cutout or opening 43 in the housing 23. The arm 41 carries a yoke 40 which is pivotally connected to a collar 39 that is mounted on the shaft 18.

Spaced from the housing 23 and secured to a beam, such as the beam 11, is a casing 44. A finger 45 extends transversely from an end of the arm 41 and the finger 45 is movably mounted in the casing 44. A head 46 is arranged on the inner end of the finger 45. A conduit 47 serves to connect the casing 44 to the air brake system of the vehicle.

Also arranged in the casing 44 is a box or container 48 which is provided with an opening 49 therein whereby air can enter the container 48 through the opening 49. A pair of contacts 50 and 51 are mounted in the casing 44, and the contacts 50 and 51 have electric wires or conductors extending therefrom. A plunger 52 is movably mounted in the box 48, and the plunger 52 is mounted for movement into and out of engagement with the contacts 50 and 51. A coil spring 53 is positioned in the box 48, and the coil spring 53 abuts the plunger 52. Wires 54 and 55 lead from the contacts 50 and 51.

A movable sleeve 56 may be mounted on the shaft 18, and the sleeve 56 may abut links 57 which are pivotally connected to lugs 58 through the medium of pivot pins 59, Figure 3.

From the foregoing, it is apparent that there has been provided an emergency brake which has a positive action and the present invention can be used on all trucks using air brakes and this will result in the saving of lives as well as personal property. Heretofore, there have been frequent serious accidents which might have been prevented if there had been provided a means for stopping the vehicle after the air brakes had failed. The present emergency brakes in use on vehicles have proven to be unsatisfactory and inadequate and the reason for this is as follows. A truck with a load of ten tons or more cannot be halted by the use of a hand emergency brake as a general rule. In fact, this emergency hand brake will seldom hold a truck stationary, after the truck has been halted on an incline of any degree.

The present invention includes the starter motor 34 which provides the power to operate the flywheel 26 through the medium of the worm 33 and gear 31. The flywheel 26 is engaged by the clutch plates 25. The bearings such as the bearing 17 may be secured to the frame or subframe of the truck. The cable 20 may be made of steel and serves to transfer power from the winch or reel 19 to the idler shaft 16. The cables 22 connect the idler shaft 16 to the slack adjusters 15. The purpose of the idler shaft 16 is to distribute power equally to each wheel and additional cables may be used or connected to as many wheels as desired. The slack adjusters including the rods 15 may be conventional equipment and the cables 22 serve to actuate the rods 15. A conventional air brake mechanism can be used for the normal operation of braking the vehicle.

There is further provided the air pot 44 and this will provide power to release the clutch 25 only when the truck system is in normal working pressure or condition. The emergency brake will automatically go into operation as soon as the brake system fails and can be released only when normal conditions in the system are restored. Thus, the clutch plates 25 can only be actuated to operate the emergency brake when the air system fails or when the operator actuates the starter motor 34, as for example through the medium of the manually operable switch 38. The arm 41 is a clutch release arm which serves to engage and disengage the clutch during operation. It is to be understood that these parts can be mounted on a trailer as well as a truck.

The present invention is simple to operate and can be installed quickly and easily on existing vehicles. With the present invention there is provided an emergency brake in the event of a failure in the air system, and also, by means of the present invention, the conventional hand brake on vehicles can be eliminated. Furthermore, the present invention can be installed on automobiles which use a cable type of emergency brake.

In the event of a failure in the brake system, the finger 45 and head 46 will move inwardly to the position shown in Figure 3 and at the same time the plunger 52 will be urged upwardly due to the coil spring 53. This will complete the circuit to the contacts 50 and 51 so that the motor 34 will be energized whereby the disc 26 will be rotated through the provision of the intermeshing gears. Then, the shaft 18 will be rotated and this will turn the winch 19 which will cause the cable 20 to move the idler shaft 16. As the idler shaft 16 is moved, the cables 22 will be moved to thereby actuate the rods 15 so that the brakes in the wheel drums 14 will be actuated so that further movement of the vehicle will be prevented. After the defect has been repaired, and when pressure builds up in the conduit 47 and casing 44, the air pressure entering through the aperture 49 will move the plunger 52 to compress the coil spring 53 so that the plunger 52 will move away from the contacts 50 and 51 to thereby deenergize the motor 34. At the same time, the air pressure will force the finger 45 outwardly from the position shown in Figure 3 so that normal operation of the clutch 25 and its associated parts can be brought about. If desired, the switch 38 can be manually actuated to set the brakes as when the brakes are being used in lieu of the usual hand emergency brake.

The numeral 49 designates an aperture or port hole which serves to relieve the air pressure in the automatic air electric switch. This port hole 49 is necessary since it insures that the diaphragm can work up and down freely and quickly in order to permit the cylinder to breathe.

The numeral 53 designates a large heavy duty compression spring which automatically makes contact to the electric poles in the event that the air pressure decreases below safe working conditions. When the air pressure is up to maximum, this spring is depressed by the air pressure. When the air pressure is below the safe working conditions, this spring completes the circuit between the contacts 50 and 51 so as to complete the circuit to the electric motor which in turn goes into action and drives the unit. Thus the device is made to operate automatically. Otherwise, the brake mechanism will be operated manually by a truck driver at any desired pressure. The present invention is safe to use since the brake is automatically put into action in the event of failure in the vehicle brake system.

I claim:
1. In a vehicle brake system, in combination with wheel drums, a first shaft, a pair of spaced parallel levers extending from said shaft and secured thereto, a second shaft arranged in spaced parallel relation with respect to said first shaft, a reel mounted on said second shaft and having a cable trained thereover, said cable being connected to one of said levers, brake rods extending into said wheel drums, a pair of cables connecting said brake rods to said levers, a housing having a disc rotatably arranged therein, a motor arranged exteriorly of said housing, gear means connecting said motor to said disc, said disc including a recess defining a shoulder, a plurality of movable plates mounted for movement into and out of frictional engagement with said shoulder, said second shaft extending into said housing and having a splined portion engaging said plates, an arm pivotally connected to said housing and having a portion engaging said second shaft, a casing spaced from said housing, a conduit connected to said casing, a finger extending transversely from said arm and projecting into said casing, a head on the inner end of said finger, a container arranged in said casing and including a wall provided with an opening, a plunger movably mounted in said container, a pair of spaced parallel contacts mounted in said casing and adapted to be engaged by said plunger, electric conducting wires leading from said contacts to said motor and to a source of electricity, and resilient means arranged in said container and abutting said plunger.

2. The structure as defined in claim 1 wherein said resilient means comprises coil springs.

3. In a vehicle brake system, in combination with wheel drums, a first shaft, a pair of spaced parallel levers extending from said shaft and secured thereto, a second shaft arranged in spaced parallel relation with respect to said first shaft, a reel mounted on said second shaft and having a cable trained thereover, said cable being connected to one of said levers, brake rods extending into said wheel drums, a pair of cables connecting said brake rods to said levers, a housing having a disc rotatably arranged therein, a motor arranged exteriorly of said housing, gear means connecting said motor to said disc, said disc including a recess defining a shoulder, a plurality of movable plates mounted for movement into and out of frictional engagement with said shoulder, said second shaft extending into said housing and having a splined portion engaging said plates, an arm pivotally connected to said housing and having a portion engaging said second shaft, a casing spaced from said housing, a conduit connected to said casing, a finger extending transversely from said arm and projecting into said casing, a head on the inner end of said finger, a container arranged in said casing and including a wall provided with an opening, a plunger movably mounted in said container, a pair of spaced parallel contacts mounted in said casing and adapted to be engaged by said plunger, electric conducting wires leading from said contacts to said motor and to a source of electricity, and resilient means arranged in said container and abutting said plunger, said resilient means comprising a coil spring, said gear means comprising gear teeth on said disc, and a worm meshing with said gear teeth and driven by said motor.

References Cited in the file of this patent

UNITED STATES PATENTS

| 1,501,600 | Hartford | July 15, 1924 |
| 2,519,774 | Letner | Aug. 22, 1950 |

FOREIGN PATENTS

| 515,958 | Great Britain | Dec. 19, 1939 |